Patented Feb. 26, 1935

1,992,576

UNITED STATES PATENT OFFICE 1,992,576

MATERIAL FOR HARD-SOLDERING AND WELDING

Hans Kanz, Zurich-Albisrieden, Switzerland

No Drawing. Application January 31, 1933, Serial No. 654,549. In Switzerland February 4, 1932

6 Claims. (Cl. 219—8)

Additional metallic materials required in the art of welding or hard-soldering metallic articles are usually employed in the form of metallic rods or wires; such rods are generally made from suitable metals or alloys by a pressing, rolling or drawing operation with or without the application of heat. However many valuable materials, which are suitable for the present purpose, f. i. metals or allays having a low melting point cannot be shaped to the required form of rods or wires in this way, no matter whether heat is applied or not, because they are too brittle and fragile.

Hitherto it has been necessary therefore to shape such metals or alloys for the present purpose by a casting operation; this however is very troublesome, expensive and not applicable in the case of making thin rods and wires, although there is greatest demand just for the latter in the market. The reason why the casting process is objectionable resides in the fact, that the materials in the narrow channels of the moulds do not flow with sufficient ease; this defect cannot be remedied even by casting under high pressure or by the spray-casting process.

For the reasons set forth it has been customary heretofore to shape the additional materials into granular form in cases, where the available materials or soldering metals or alloys cannot be shaped mechanically to form rods of the required small diameter, but can be cast to form blocks, which may be disintegrated to pieces of granular form by means of a pounding machine or in any other appropriate manner. The granular hard-solder produced in this way can be used by the workman for small hard-soldering places with sufficient accuracy, but these pieces are on the other hand very difficult or troublesome to handle.

The copper-zinc alloys preferably used for hard-soldering and welding purposes cannot be reduced to the form of rods of adequate length when the percentage of copper does not substantially amount to less than 58%. Such alloy however has a melting point of about 900° C., so that the same cannot be used for hard-soldering purposes in case of brass, which is rich in zinc, since the melting point of brass scarcely exceeds that of the said alloy or solder. Consequently it has been customary, hitherto to use for brass soldering purposes, cast or granulated copper-zinc alloys, wherein the proportion of copper is reduced down to 42% or even expensive silver solders were used.

On the other hand, welding or hard-soldering rods which are of a sufficiently large diameter to be manufactured by a casting operation, do not comply with all requirements insofar as they have a rough surface, which is liable to retain impurities, such impurities being obnoxious and capable of interfering with the welding or soldering action. Moreover cast rods of this kind are particularly objectionable for the reason, that they are very brittle and fragile.

The chief object of the present invention is to obviate the hereinbefore explained disadvantages of making additional materials or solders and in particular the disadvantages inherent in cast rod-shaped additional materials, by substituting therefor mechanically shaped rods.

From another aspect, it is an object of my invention to simplify the hard-soldering or welding operation by employing additional materials or hard-solders of a sufficiently low melting point in the form of rods or wires instead of hard-solders of granular form as hitherto practised.

My invention is based upon the observation that in the art of welding or hard-soldering the melting point of the additional material or hard-solder is of minor account whereas the melting point of the additional material or hard-solder already reduced to the liquid state, is of greatest importance. For by suitably positioning or adjusting the burner it is possible, without any further ado, to heat the rod of additional material or hard-solder up to a higher temperature than the brazing seam. Now this observation or knowledge is utilized according to the present invention in the following manner. For purposes of exemplification the soldering of a brass alloy by means of an additional material or hard-solder made in accordance with the present invention shall be described hereinafter, which in consideration of the melting point of said alloy contains only about 42% of copper while zinc is the main metal of the other constituents.

Additional materials or hard-solders of this character cannot be mechanically shaped to the desired form, neither in cold condition nor upon application of heat and therefore had heretofore to be used either in the form of cast rods or as a granular hard-solder, both involving the hereinbefore mentioned disadvantages. Now, according to the present invention the rod to be used as additional material is composed of two or several different metals or allays whereof at least one is susceptible of being shaped to the desired form by mechanical treatment and which are combined in such manner, ratio or proportion as to constitute upon being melted down, the desired alloy of a low melting point.

A rod or wire of this character may be manufactured in various ways, preferably by first producing mechanically a wire from a suitable copper-zinc alloy having a higher percentage of copper preferably over 58% with or without appropriate additional ingredients and subsequently coating the wire with pure zinc. The coating operation may be carried out in accordance with any known method for example by electrolysis, by dipping the wire into molten zinc, by a process similar to the Sherardizing method or by pulling a zinc tube or a plurality of such tubes over the wire.

In a modification the rod or wire may be manufactured according to the present invention by first making a tube of brass and subsequently filling the tube with another suitable metal, alloy or alloys such as zinc or a zinc alloy. The charging of the tube may be performed by inserting thereinto a wire of zinc or zinc alloy or by filling the same up with molten zinc or a zinc alloy. In some cases I prefer to use a tube of a larger diameter and to reduce the diameter thereof after the tube has been filled with zinc or a zinc alloy to the desired smaller diameter by drawing or in any other appropriate way. A rod or wire produced in the manner described above may also be provided with an outer metallic coating.

It will be seen that a hard-solder rod or wire manufactured in accordance with the present invention, first must be heated, as hereinbefore mentioned, to a temperature which is above the melting point required by the additional material. As soon however, as the metallic components of the rod or wire begin to melt, they will mix or alloy and then have only just the low melting point corresponding to the proportion or percentage of the metals thus mixed or alloyed.

I am aware of the fact that it is universally known, to provide metallic coatings on rods made of additional materials or solders. This has been done heretofore, however, only for the purpose of presenting the rods in a more pleasant appearance or preventing evaporation of readily volatile components and corrosion of the surface. Furthermore, welding or hard-soldering rods of circular, annular channel cross-section or the like made of ingot-iron, cast-iron, or copper and coated with an alloy or combination of metals or alloys are known in the art. The composition or combination of different, various metals heretofore employed in making such rods, however, served other purposes as compared with the purpose aimed at in the present invention.

In contradistinction to the prior art the additional material made in accordance with the present invention includes or embodies the novel features or facts, that at least one of the used metals or alloys, must be capable of being shaped to the desired form mechanically and that the chemical composition of all constituents of the material after having been molten, constitutes a new alloy of a different composition which cannot be mechanically shaped to the desired form. For the purpose of preventing the molten material or hard-solder from oxidation or evaporation it is advisable to add to the material at the proper time a suitable element or metal as silicon, aluminium, magnesium, manganese or the like.

It will be evident that my invention, while still being adhered to in its main essentials may be varied and adapted in many ways according to the requirements desired or most suitable under different circumstances, without in the least departing from the nature and principle of my invention.

What I claim is:

1. A copper containing additional material for welding or hard-soldering being reducible to its end-dimensions by mechanical shaping and consisting of a metallic compact core and a metallic compact shell, the metals or alloys in the shell and in the core being used in such ratio to each other, that in welding or soldering an alloy with such a percentage of copper is formed, which is not capable of being shaped by mechanical reduction-methods, the combined copper contents in the core and shell being between 42 and 58%.

2. A rod shaped additional material for welding and hard-soldering according to claim 1, being reducible to its end-dimensions by mechanical shaping comprising a metallic compact shell consisting of zinc or a zinc alloy and a metallic compact core consisting of a copper alloy with more than about 58% copper, the metals or alloys in the shell and in the core being used in such a ratio to each other that in welding or soldering an alloy with about 42–58% copper is formed, which is not capable of being shaped to its end-dimensions by mechanical reduction.

3. A welding rod comprising two intimately joined parallel members each of compact metallic elements, the metallic elements of one of said members consisting of an alloy with over 58% of copper and the remainder substantially zinc.

4. A welding rod comprising two intimately joined parallel members each of compact metallic elements, the metallic elements of one of said members consisting of an alloy with over 58% of copper and the remainder substantially zinc, one of said members forming a tight-fitting sleeve around the other member.

5. A welding rod comprising two intimately joined parallel members each of compact metallic elements, the metallic elements of one of said members consisting of an alloy with over 58% of copper and the remainder substantially zinc, and the two members together forming an alloy with 42% to 58% copper content when melted during the welding process.

6. A welding rod comprising two intimately joined parallel members each of compact metallic elements, the metallic elements of one of said members consisting of an alloy with over 58% of copper and the remainder substantially zinc, one of said members forming a tight-fitting sleeve around the other member, and the two members together forming an alloy with 42% to 58% copper content when melted during the welding process.

HANS KANZ.